United States Patent [19]

Konomi et al.

[11] 4,020,805
[45] May 3, 1977

[54] INTAKE MANIFOLD FLOW EQUILIZING MEANS

[75] Inventors: Toshiaki Konomi; Joji Nurita, both of Susono; Yasushi Tanazawa, Nagoya, all of Japan

[73] Assignee: Toyota Jidosha Kogyo Kabushiki Kaisha, Toyota, Japan

[22] Filed: Dec. 11, 1975

[21] Appl. No.: 639,704

Related U.S. Application Data

[62] Division of Ser. No. 412,021, Nov. 1, 1973, Pat. No. 3,965,873.

[30] Foreign Application Priority Data

July 12, 1973 Japan .............................. 48-77871

[52] U.S. Cl. .................... 123/52 M; 123/188 M; 123/141; 48/180 R; 48/180 M
[51] Int. Cl.² ......................................... F02B 75/18
[58] Field of Search .......... 123/141, 52 M, 52 MV, 123/188 M, 52 R; 48/180 R, 180 M

[56] References Cited

UNITED STATES PATENTS

| 1,281,899 | 10/1918 | Berg | 48/180 R |
| 1,311,071 | 7/1919 | Hunter | 48/180 R |
| 1,942,227 | 1/1934 | Timian | 123/52 M |
| 3,747,581 | 7/1973 | Kolb | 48/180 R |

FOREIGN PATENTS OR APPLICATIONS

| 664,130 | 6/1922 | France | 48/180 R |
| 437,020 | 10/1935 | United Kingdom | 123/141 |
| 359,062 | 10/1931 | United Kingdom | 48/180 R |

*Primary Examiner*—Ronald H. Lazarus
*Attorney, Agent, or Firm*—Kenyon & Kenyon et al

[57] ABSTRACT

An intake manifold for a multicylinder internal combustion engine has a riser connectable to a carburetor and branch pipes connecting the riser and each suction port of respective cylinders of the engine, and is characterized by being provided with orifice means located at a position in each said branch pipe for defining the cross sectional area of the position to a preselected magnitude thereby rendering pressure in each said branch pipe and each said intake ports of the cylinder equal. The orifice means can be constituted by a plate-shaped gasket having orifices to be located in the positions in each said branch pipes.

3 Claims, 16 Drawing Figures

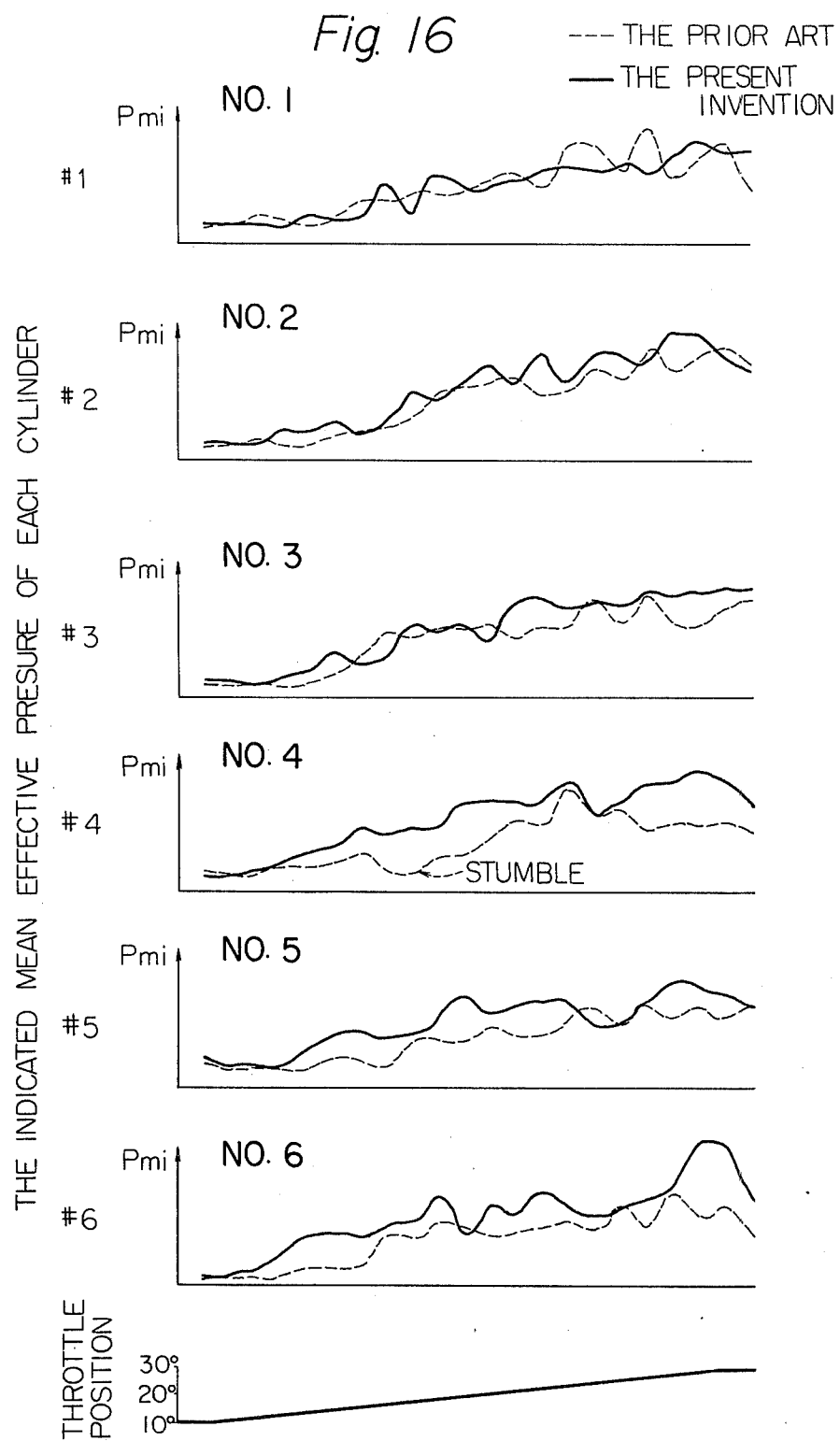

INTAKE MANIFOLD FLOW EQUILIZING MEANS

This is a division of application Ser. No. 412,021 filed Nov. 1, 1973, now U.S. Pat. No. 3,965,873.

The present invention relates to an intake manifold of an internal combustion engine, especially of a multicylinder internal combustion engine.

In order to increase the power of the multicylinder internal combustion engine while reducing harmful constituents in the exhaust gas from the engine, such as carbon monoxide and unburned hydrocarbons, various attempts to improve the fuel distribution have previously been made.

Generally, for reducing the harmful constituents in the exhaust gas, it is known that setting the air-fuel ratio lean is quite effective. However, in the case of a lean air-fuel ratio, the fuel distribution to every cylinder of the multicylinder internal combustion engine must be made equal. In other words, fluctuation of the air-fuel ratio between the cylinders must be eliminated. Otherwise, in a cylinder in which the air-fuel ratio fluctuates to be leaner than that in other cylinders, the fuel charge will fail to be ignited and accordingly, combustion does not take place. If this happens, the quantity of unburned hydrocarbons remaining in the exhaust gas is increased.

The known attempts to obtain the uniform fuel distribution to every cylinder have been directed to varying the shape of the riser and/or the branching points from the riser of the intake manifold. However, such attempts have not yet provided a complete solution.

The inventors, therefore, have made various investigations and laboratory experiments, in order to improve the fuel distribution. It should be noted that in the partial load range of an engine, the air flow in the intake manifold is very complex, and further that the fuel distribution to each cylinder is carried out by transporting the fuel evaporated due to negative pressure within the intake manifold by means of the air flow. Now as a result of their aforesaid investigations and experiments, it was understood by the inventors that in the intake of the fuel charge into respective cylinders, the intake abilities of respective cylinders directly depend on the pressures within respective branch pipes connecting the riser of the intake manifold and respective cylinders. In this case, since the magnitude of the pressure corresponds to the magnitude of the velocity of the air flow within each branch pipe, it is easily understood that the magnitude of velocity of the air flow within each branch pipe is made uniform by making the magnitude of pressure within the branch pipe of each cylinder equal. As a result, the fuel distribution to each cylinder can be equalized in the partial load range of the engine.

Therefore, it is the object of the present invention to provide an intake manifold for use in a multicylinder internal combustion engine, in which the air flow within branch pipes connecting the riser of the intake manifold and respective cylinders of the engine, is made equal thereby attaining the uniform fuel distribution.

According to the present invention, an intake manifold employed for use in a multicylinder internal combustion engine comprises:

a riser connectable to a carburetor;

branch pipes connecting the riser and respective intake ports of respective cylinders of the engine; and orifice means located at a position in each said branch pipe for defining the cross sectional area of the position to a predetermined magnitude thereby rendering pressures in each said branch pipe and each said cylinder intake port equal.

The present invention will become more apparent from the ensuing description of several embodiments with reference to the accompanying drawings wherein.

Figure 15:
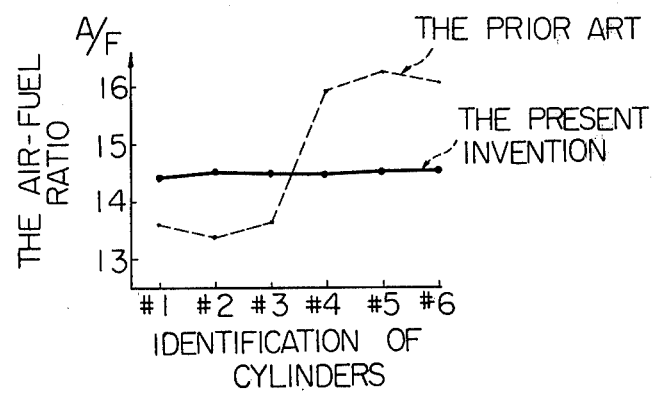

FIG. 15 is an experimental diagram showing fluctuation of the air-fuel ratio within respective cylinders of a six-cylinder engine with respect to two engines, one provided with a conventional intake manifold and the other with an intake manifold according to the present invention; and FIG. 16 is a diagram showing variation of the indicated mean effective pressure in each cylinder of a six-cylinder internal combustion engine during variation of the load applied to the engine with respect to two engines, one provided with a conventional intake manifold and the other with an intake manifold according to the present invention.

Figure 1:
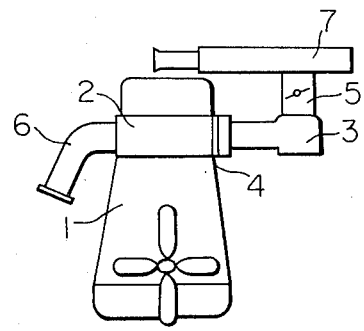
FIG. 1 is a schematic view of an internal combustion engine provided with an intake manifold according to the present invention.

In FIG. 1, reference numeral 1 is an internal combustion engine body provided with a cylinder head portion 2. An intake manifold 3 is connected to a carburetor 5, and provided with an orifice element 4 according to the present invention. 6 is an exhaust pipe, and 7 is an air cleaner.

Figure 2:
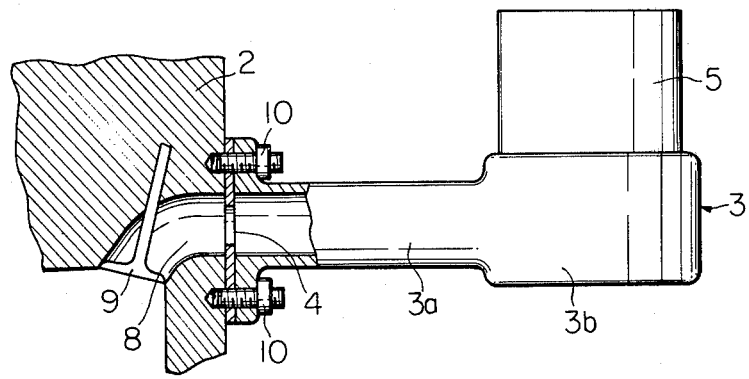
FIG. 2 is a partial elevation view showing an intake manifold for an internal combustion engine, according to the present invention in part cross section.

Referring to FIG. 2 which shows a part of FIG. 1, in partial cross section and in an enlarged scale, the fuel mixture produced by carburetor 5 is manifolded by a riser 3b of the intake manifold 3. The fuel mixture, then, passing through each branch pipe 3a and through orifice element 4, flows into each intake port 8 of each cylinder of the internal combustion engine body 1. The fuel mixture in each intake port 8 is introduced into the corresponding cylinder when its intake valve 9 is opened. In FIG. 2, screw bolts and nuts for securing the intake manifold 3 to cylinder head 2 are generally designated by a reference numeral 10. As is shown in FIG. 2, since the intake manifold 3 is provided with orifice element 4, the fuel mixture undergoes a throttling action when passing through the orifice element 5, which is in the case of FIG. 2, located at the entrance of the intake port 8. Thus, if the throttling action for each cylinder is appropriately preset by predetermining the size of the cross sectional area of each orifice formed in the orifice element 4, pressures within each branch pipe 3a and each intake port 8 can be made uniform.

Figure 3:
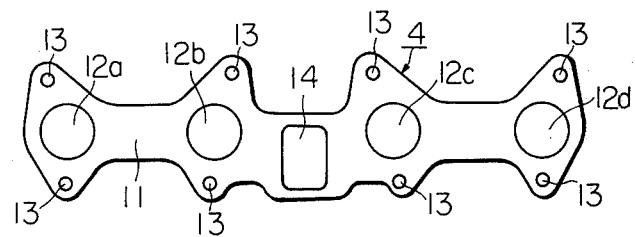
FIG. 3 is a plan view of an embodiment of an integral element of an intake manifold according to the present invention.
Figure 4:
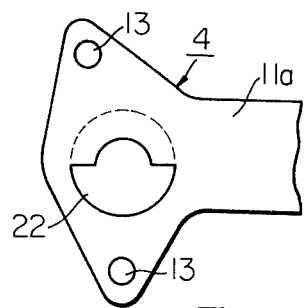
FIG. 4 through FIG. 13 are partial plan views of further embodiments of an integral element of an intake manifold according to the present invention, respectively.

FIG. 3 shows an embodiment of the orifice element 4, which consists of a gasket 11 made of a thin steel plate. The gasket 11 has four circular orifices $12a$, $12b$, $12c$ and $12d$, provided, in this case, for a four-cylinder internal combustion engine, and a through-hole 14 through which heated water for warming up the intake manifold flows. The diameters of four circular orifices 12a, 12b, 12c and 12d are respectively defined so that when the gasket 11 is located at the entrance of intake ports 8 of the engine, the air flow passing through the orifices 12a, 12b, 12c and 12d undergoes throttling action and as a result, pressures in respective branch pipes 3a connected to respective cylinders become equal. The gasket 11 is also provided with mounting holes 13 for mounting the gasket 11 to the cylinder head 2 as shown in FIG. 2.

It will be understood that according to the embodiment of FIG. 3, the sizes of the cross sectional areas of the entrance of intake ports 8 are preset by means of the orifices of the gasket 11, so that uniform air flow is produced in the intake manifold 3. Thus the fuel distribution to each cylinder is made equal. Since the orifice element 4 consists of gasket 11 made of a thin steel plate, it can easily be manufactured by the conventional punching method thereby enabling a low cost orifice element to be provided. It should also be appreciated that the orifice element 4 is easily mounted to the engine simply by means of screw bolts and nuts 10. A steel plate can be used since the gasket 11 only contacts the fuel mixture flowing through the intake manifold 3 and accordingly the use of a special costly material, such as a corrosion resistant material, is not required. This fact also enables a low cost orifice element 4 to be used. The inventors' experiment with a six-cylinder in line engine shows that in the case of an intake port 8 having an entrance diameter of 32 millimeters, pressures in all branch pipes 3a are made equal by reducing the entrance diameters of the intake ports 8 of the second and the third cylinders to 30 millimeters and 28 millimeters, respectively, and that the fuel distribution to each cylinder then approaches a uniform condition.

Figure 5:
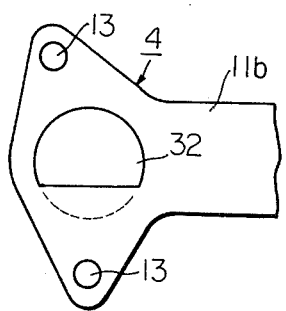
Figure 6:
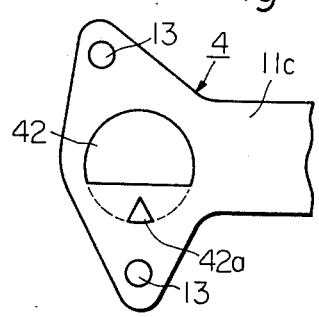
Figure 7:
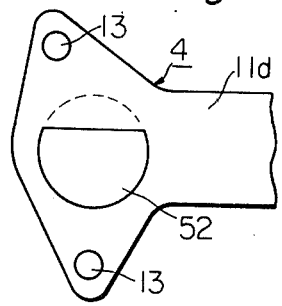
Figure 8:
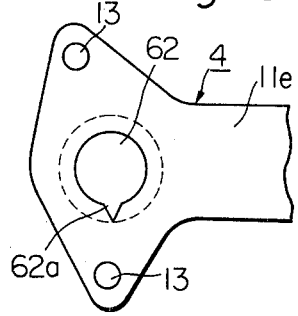
Figure 9:
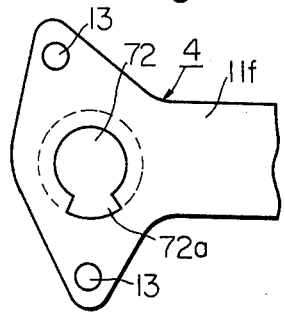
Figure 10:
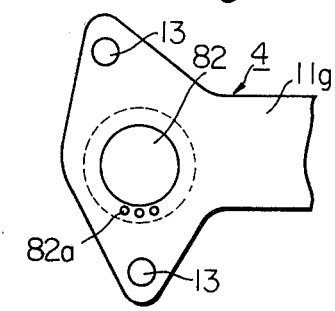
Figure 11:
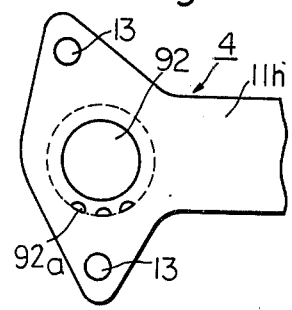
Figure 12:
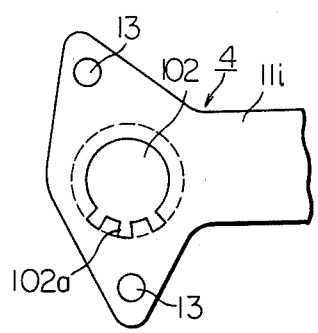
Figure 13:
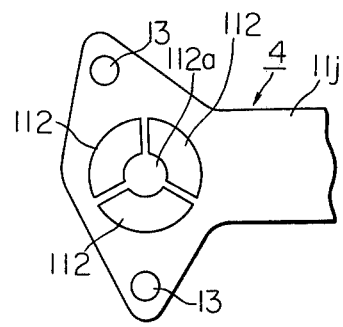
Figure 14:
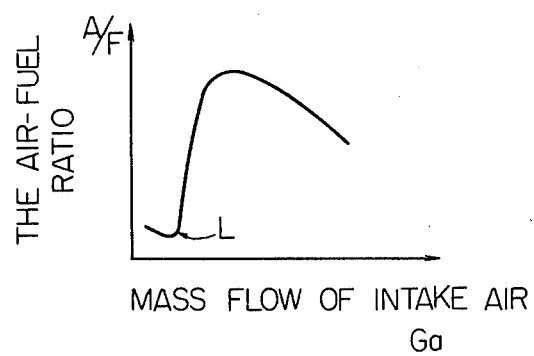
FIG. 14 is a diagram showing a general characteristic of the air-fuel ratio with respect to change of the mass flow of intake air passing through a carburetor.

FIG. 4 through FIG. 13 show, in part, various embodiments of the orifice element 4 according to the present invention, respectively. These embodiments of the orifice element 4 consist of gaskets 11a through 11j, which are similar to the gasket 11 of the embodiment of FIG. 3. These gaskets 11a through 11j, however, are different from the gasket 11 in that the gasket 11 is characterized by varying the diameters of the circular orifices formed therein, but on the other hand, each gasket 11a, 11b, ..., or 11j of FIG. 4 through FIG. 13 is characterized by varying relative sizes of specified shapes of its orifices when changing the partial cross sections of respective branch passageways of the intake manifold, so as to provide an equal pressure within each branch pipe 3a. In FIG. 4 through FIG. 13, dotted lines are intended to show the internal diameter of the branch pipe 3a where the gasket is located. The above-mentioned specified shapes of the orifices of each gasket 11a, 11b, . . . or 11j can be also advantageous for improving the individual performance characteristics of various internal combustion engines. For example, the shapes of the orifices as shown in FIGS. 4, 6, 7 8 and 9, by which the orifices generally provide through-openings in the bottom portions of the branch passageways of the intake manifold 3, enable the liquid fuel to freely pass through the orifices 22, 42a, 52, 62a and 72a thereby preventing the slow start of an engine, the occurrence of surging during low temperature range and the pause of the rise of the indicated mean effective pressure, which is usually referred to as "stumbles", during acceleration. This is useful in the case of engines having an inferior starting characteristic in the low temperature range. Also, when the embodiment of FIG. 5 is applied to an engine having a relatively superior starting characteristic in the low temperature rage, the liquid fuel at the bottom part under the orifice 32 will be atomized by the air flow. The atomized fuel is then introduced into each cylinder of the engine thereby enabling increase of the power of the engine. That is, the liquid fuel is prevented from being directly introduced into each cylinder along the bottom of the branching pipes 3a of the intake manifold 3. Further, when the embodiments of the orifice element 4, as shown in FIGS. 10, 11 and 12 are employed for engines having a relatively inferior starting characteristic in the low temperature rnage, the knotches or apertues 82a, 92a and 102a, which are provided below the orifices 82, 92 and 102, respectively, prevent the topping of liquid fuel and also provide a throttling effect for the air flow passing through the small apertures 82a, 92a, 102a thereby increasing velocity of the air flow behind the orifice element 4. The increase of the air flow velocity will improve atomization of the liquid fuel. Therefore, the employments of the embodiments of FIGS. 10, 11 and 12 can bring about improvement of the starting characteristic of the engine in the low temperature range as well as increase of the power of the engine. When the embodiment of FIG. 13, in which each orifice is constituted by three segmental openings 112 surrounding a central closed part 112a, is employed, the air flow entering into each intake port 8 from the branch passageway of intake manifold 3 will come into collision with the closed part 112a of the orifice element 4 thereby increasing turbulence of the air flow. This turbulence of the air flow can blow the liquid fuel off so that mixing of the air and the fuel is improved. Consequently, combustion within each cylinder is promoted. Therefore, the power of the engine may be increased. Any orifice element 4 of FIG. 4 through FIG. 13 is usually provided with orifices of a uniform shape when it is employed for a certain engine. However, it is of course possible to vary the shapes of orifices of the orifice element 4 among respective cylinders of an engine, if such is required. In the diagram of FIG. 14 showing the air-fuel ratio characteristic, the abscissa shows the change of weight flow of intake air in the carburetor, and the ordinate shows the value of the air-fuel ratio. Generally in the range of low speed and small loads, the combustion is fairly imperfect and is often missed. The initial part of the range of low speed and small loads corresponds to the range shown between the origin and the point designated by L in FIG. 14. In this initial part, the engine is supplied with fuel by an idle fuel supply system. Therefore, the value of the air-fuel ratio is kept rich. In the carburetor, there is a general tendency for the air-fuel ratio to become lean in response to increase of mass flow of intake air. In contrast, in the range between the origin and the point L of FIG. 14, the value of the air-fuel ratio tends to become richer in response to increase of mass flow of intake air, owing to the fuel supply by the main nozzle of the carburetor. Thus though it is generally necessary to improve the fuel distribution in the range of low speed and small loads of the engine this is particularly so in the range after the above-mentioned initial part. In the range of high speed and large loads of the engine, the combustion generally becomes satisfactory and also, a power jet for supplying the fuel comes into operation together with the main nozzle so that the air-fuel ratio becomes richer. Because of this, in the range beyond so-called three quarter load, slightly inferior fuel distribution can be neglected.

FIGS. 15 and 16 are diagrams of the inventors' experimental results, showing differences between six-cylinder engines provided with an intake manifold according to the present invention and with a known intake manifold. In FIGS. 15 and 16, dotted lines show the results for the known intake manifold, and solid lines show the results for the intake manifold of the present invention.

Now, FIG. 15 is a diagram indicating the fluctuation of the air-fuel ratio between respective cylinders, in the partial load range of the engine. It will be understood from FIG. 15 that in the engine provided with an intake manifold according to the present invention, the fluctuation of the airfuel ratio between respective six cylinders is quite small due to improvement of the fuel distribution.

FIG. 16 is a diagram indicating each indicated mean effective pressure within each of No. 1 to No. 6 cylinders during acceleration. In FIG. 16, the change of load is represented by the continuous change of the throttle valve position in the carburetor. From FIG. 16, it will be clearly understood that while the throttle valve position changes from 10° position to 30° position, the indicated mean effective pressures within No. 4 to No. 6 cylinders in which the air-fuel ratio has conventionally been leaner than the other cylinders, rise according to the present invention. Also, it will be seen that the stumble which conventionally appeared in No. 4 cylinder for the known intake manifold, completely disappears in No. 4 cylinder for the intake manifold according to the present invention. Thus, by the improvement of the fuel distribution to each cylinder of a multicylinder engine, the indicated mean effective pressures within each of the cylinders of the engine are also made equal. The equal indicated mean effective pressure within each of the cylinders certainly improves response of the engine upon changing of loads as well as the acceleration characteristic of a vehicle when an engine provided with an intake manifold according to the present invention is used for a vehicle.

Now, it will be understood that according to the present invention, an improved intake manifold is provided without increasing difficulty and cost in manufacturing the intake manifold compared with the known one. Further the improved intake manifold achieves increase of power of an internal combustion engine together with improvement of the starting characteristic in the low temperature range and the output response of the engine. Moreover, the improved intake manifold enables reduction of harmful constituents remaining in the exhaust gas from an internal combustion engine.

What is claimed is:

1. An intake manifold for a multicylinder internal combustion engine of the type including a riser connected to a carburetor and branch pipes connecting the riser to intake ports of respective cylinders of the engine, the manifold being separable from the engine at an interface lying in a plane intersecting respective portions in each of the branch pipes, wherein the improvement comprises:

a flat gasket inserted at said interface and having orifices located at said positions in said respective branch pipes for limiting the cross-sectional flow area at each of said positions to a preselected magnitude for equalizing the pressure drops across said orifices wherein each orifice is formed of a plurality of angularly spaced annular segmental openings surrounding an imperforate portion of the gasket centrally positioned in the respective branch pipe.

2. An intake manifold in accordance with claim 1 wherein the angularly spaced annular segmental openings of each orifice are positioned concentrically in the respective branch pipe.

3. An intake manifold in accordance with claim 1 wherein the plurality of annular segmental openings consists of three openings.

* * * * *